UNITED STATES PATENT OFFICE.

BERNARD C. LAUTH, OF PITTSBURGH, PENNSYLVANIA, ASSIGNOR TO THOMAS S. BLAIR, JR., OF CHICAGO, ILLINOIS.

METHOD FOR MAKING A MATERIAL HAVING THE GENERAL PROPERTIES OF WROUGHT-IRON.

1,067,529. Specification of Letters Patent. Patented July 15, 1913.

No Drawing. Application filed December 14, 1911. Serial No. 665,656.

*To all whom it may concern:*

Be it known that I, BERNARD C. LAUTH, a citizen of the United States, residing at Pittsburgh, in the county of Allegheny and State of Pennsylvania, have invented a new and useful Improvement in Methods for Making a Material Having the General Properties of Wrought-Iron, of which the following is a specification.

This invention relates to a process for making a material having the general characteristics of wrought-iron and it is a variant of the process of an application filed by me December 14, 1911 No. 665,655, and is covered thereby. In that process pig iron is blown in a Bessemer converter until the carbon is reduced in quantity and enough iron oxid is formed to oxidize the remaining carbon and bring the metal to nature. The metal and some slag is then transferred to a balling furnace, free from fettling, or other lining which can be worked into the ball, and is there rolled around by the rotation of the furnace until the metal goes to nature and forms a ball. In that application it is stated that the slag is usually the slag from the converter unchanged, although the slag might be modified if desired or a special slag might be made. The statement was there made because most pig iron will be of a type sufficiently low in phosphorus to make the use of an acid converter and its slag quite practical. However, when iron high in phosphorus is used, the process may profitably be varied as herein set out.

Inasmuch as in the present process a high silicon and phosphorus content is of no special importance, the blast furnace practice for making the pig may be varied. In working ore high in phosphorus it has heretofore been desirable, even at greater expense, to keep down the silicon content, while in the present process the silicon may run as it will, no effort being made, even with high phosphorus ore, to keep down this element. In this way the pig may be cheaply made from high phosphorus ore. The molten pig is blown in an acid converter to the point set out in said application and perhaps slightly further, thus eliminating the silicon but leaving the phosphorus. A special slag is meanwhile made up. This should be a free flowing slag, (as distinguished from the very viscous, strongly basic slags) but it must be somewhat basic in its nature. This may vary in its constitution but it may well be silicate of iron (Bessemer slag) with sufficient lime added to give a basic character. The metal and a quantity of this slag are transferred to the balling furnace, which is basic lined, where the iron is brought to nature. As it goes to nature, particle by particle, the iron oxid present reacts on the phosphorus, forming an acid radical which unites with the slag. Any reverse reaction is prevented by the fact that the iron has meanwhile gone to nature. In other words, while a strongly basic slag is usually needed to remove the phosphorus from iron, owing to a strong tendency to a reverse reaction between the phosphatic slag and the dephosphorized iron, in this process a slightly basic slag will do, because that phosphorus which comes out just as the metal goes to nature stays in the slag, the reverse reaction being prevented by the solidification of the iron. In this process, therefore, the basic converter need never be used, the acid converter being substituted even on iron which would normally require basic treatment. The slag, too, will be of just that freely flowing type most desirable in the making of wrought-iron.

I realize that the foregoing process is subject to considerable variation in detail and I do not therefore intend to be limited to the specific embodiment shown, except as pointed out in the following claims, in which my intention is to claim all the novelty in the process as broadly as is permitted by the state of the art.

What I claim as new and desire to secure by Letters Patent is—

1. The method which consists in blowing molten impure iron, containing phosphorus and silicon, according to the acid Bessemer process, until the silicon is eliminated, the carbon is substantially oxidized and iron oxid is formed in sufficient quantity to oxidize the remaining carbon and at least a portion of the phosphorus, and thereupon transferring the molten metal and a quantity of basic slag to a basic-lined receptacle and agitating it until the iron oxid oxidizes the carbon and the metal goes to nature.

2. The method which consists in blowing molten impure iron, containing phosphorus and silicon, according to the acid Bessemer process until the silicon is eliminated, the carbon is substantially oxidized and iron oxid is formed in sufficient quantity to oxidize the remaining carbon and phosphorus, and thereupon transferring the molten metal and a quantity of basic slag to a basic lined receptacle and agitating it until the iron oxid oxidizes the carbon and the metal goes to nature.

3. The method which consists in blowing molten impure iron, containing phosphorus and silicon, according to the acid Bessemer process until the silicon is eliminated, the carbon is substantially oxidized and iron oxid is formed in sufficient quantity to oxidize the remaining carbon, and thereupon transferring the molten metal and a quantity of freely flowing, slightly basic slag to a basic lined receptacle and agitating it until the iron oxid oxidizes the carbon and the metal goes to nature.

4. The method which consists in blowing molten impure iron containing phosphorus and silicon, according to the acid Bessemer process, until the silicon is eliminated, carbon is substantially oxidized and iron oxid is formed in sufficient quantity to oxidize the remaining carbon, and thereupon transferring the molten metal and a quantity of slag of silicate of iron having sufficient lime added thereto to give it a basic character, to a basic lined receptacle and agitating it until the iron oxid oxidizes the carbon and the metal goes to nature.

BERNARD C. LAUTH.

In presence of—
　RUSSELL WILES,
　DUDLEY BROWNE.